United States Patent [19]

Hoh et al.

[11] 3,932,326

[45] Jan. 13, 1976

[54] SOFT THERMOPLASTIC SEGMENTED COPOLYESTERS AS PRESSURE SENSITIVE ADHESIVES

[75] Inventors: George Lok Kwong Hoh; Joseph Edward Reardon, both of Wilmington, Del.

[73] Assignee: E. I. Du Pont de Nemours and Company, Wilmington, Del.

[22] Filed: Feb. 6, 1974

[21] Appl. No.: 439,848

Related U.S. Application Data

[63] Continuation-in-part of Ser. Nos. 333,519, Feb. 20, 1973, abandoned, and Ser. No. 406,650, Oct. 9, 1973, abandoned.

[52] U.S. Cl............... 260/26; 260/28; 260/33.6 R; 260/33.8 R; 260/75 R; 260/75 H; 260/842; 260/860
[51] Int. Cl.² .................. C08G 63/12; C08L 91/06; C08L 93/04; C08L 95/00
[58] Field of Search............. 260/26, 75 R, 28, 842, 260/860, 75 H, 33.6 R, 33.8 R

[56] References Cited
UNITED STATES PATENTS

| | | | |
|---|---|---|---|
| 3,023,192 | 2/1962 | Shrivers | 260/75 |
| 3,651,014 | 3/1972 | Witsiepe | 260/75 R |
| 3,832,314 | 8/1974 | Hoh et al. | 260/26 |

Primary Examiner—Donald E. Czaja
Assistant Examiner—H. H. Fletcher

[57] ABSTRACT

Soft thermoplastic segmented copolyester elastomers consisting essentially of a multiplicity of recurring short chain ester units and long chain ester units joined through ester linkages, said short chain ester units amounting to about 15 to less than 30 percent by weight of said copolyester and being derived from a mixture of aromatic dicarboxylic acids such as a mixture of terephthalic acid and isophthalic acid containing about 55 to 95 percent by weight of terephthalic acid, and butanediol, and said long chain ester units amounting to more than 70 to 85 percent by weight of said copolyester and being derived from a mixture of aromatic dicarboxylic acids such as a mixture of terephthalic acid and isophthalic acid containing about 55 to 95 percent by weight of terephthalic acid, and polytetramethylene ether glycol having an average molecular weight of about 1500 to 3500, said copolyester having a melt index of less than about 30 and a melting point of about 90° to 130°C. give superior performance when formulated into pressure sensitive adhesives. Such adhesive compositions comprise (A) about 1 to 99 percent by weight of the soft thermoplastic segmented copolyester and (B) about 1 to 99 percent by weight of one or more low molecular weight thermoplastic resins.

11 Claims, No Drawings

SOFT THERMOPLASTIC SEGMENTED COPOLYESTERS AS PRESSURE SENSITIVE ADHESIVES

CROSS-REFERENCE TO RELATED APPLICATIONS

This is a continuation-in-part of application Ser. No. 333,519, filed Feb. 20, 1973, now abandoned and application Ser. No. 406,650, filed Oct. 9, 1973, now abandoned.

BACKGROUND OF THE INVENTION

1. Field of the Invention

This invention relates to soft thermoplastic, segmented copolyester elastomers and to their use in pressure sensitive adhesives.

2. Description of the Prior Art

Segmented copolyester elastomers are not new. In U.S. Pat. No. 3,023,192 Shivers teaches segmented copolyesters containing about 25 to 65 percent by weight of short chain ester units preferably derived from an aliphatic glycol and an aromatic dicarboxylic acid, and about 35 to 75 percent by weight of long chain ester units preferably derived from a high molecular weight polyether glycol and an aromatic dicarboxylic acid which are useful for the preparation of spandex-type fibers.

In copending application Ser. No. 279,370, filed Aug. 10, 1972, now U.S. Patent 3,832,314, Hoh and Tsukamoto teach thermoplastic compositions containing (A) 1 to 99 percent by weight of thermoplastic segmented copolyester elastomer consisting essentially of a multiplicity of recurring short chain ester units and long chain ester units joined through ester linkages, said short chain ester units amounting to 15 to 75 percent by weight of said copolyester and being of the formula

and said long chain ester units amounting to 25 to 85 percent by weight of said copolyester and being of the formula

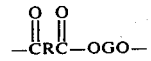

wherein R is the divalent aromatic radical remaining after removal of the carboxyl groups from aromatic dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6000, said copolyester having a melt index of less than 150 and a melting point of at least 125°C., and (B) 1 to 99 percent by weight of low molecular weight thermoplastic resin which forms compatible mixtures with the segmented copolyester, is thermally stable at 150°C., and has a melt viscosity of less than 10,000 centipoises at 200°C.

Although the compositions of the Hoh and Tsukamoto patent have good bond strength as hot melt adhesives, they do not make particularly good pressure sensitive adhesives. In order to provide good pressure sensitive adhesive properties, it is necessary that the adhesive remain tacky on its surface for an extended period of time. The pressure sensitive adhesive compositions exemplified in the Hoh and Tsukamoto patent had to be used immediately because they lacked this quality.

SUMMARY OF THE INVENTION

In accordance with this invention soft thermoplastic segmented copolyester elastomers which are useful in preparing superior pressure sensitive adhesives are provided which consist essentially of a multiplicity of recurring short chain ester units and long chain ester units joined through ester linkages, said short chain ester units amounting to about 15 to less than 30 percent by weight of said copolyester and being of the formula

and said long chain ester units amounting to more than 70 to 85 percent by weight of said copolyester and being of the formula

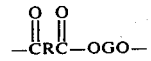

wherein R is the divalent aromatic radical remaining after removal of the carboxyl groups from aromatic dicarboxylic acid having a molecular weight of less than about 350, said aromatic dicarboxylic acid being about 55 to 95 percent by weight terephthalic acid, D is the divalent radical remaining after removal of the hydroxyl groups from butanediol, and G is the divalent radical remaining after removal of the terminal hydroxyl groups from polytetramethylene ether glycol having an average molecular weight of about 1,500 to 3,500, said copolyester having a melt index of less than about 30 and a melting point of about 90° to 130°C. These segmented copolyesters provide superior pressure sensitive adhesives when used in compositions which comprise (A) about 1 to 99 percent by weight of the segmented copolyester and (B) about 1 to 99 percent by weight of low molecular weight thermoplastic resin which forms compatible mixtures with the segmented copolyester, is thermally stable at 150°C., and has a melt viscosity of less than about 10,000 centipoises at 200°C.

DETAILED DESCRIPTION OF THE INVENTION

The soft thermoplastic segmented copolyester elastomers of this invention consist essentially of about 15 to less than 30 percent recurring short chain ester units and more than 70 to 85 percent long chain ester units joined through ester linkages. The term "consisting essentially of" as used herein, is meant to include in the copolyesters only those unspecified polymer units which do not materially affect the basic and essential characteristics of the copolyesters of this invention. In other words, this term excludes unspecified polymeric units in amounts which prevent the advantages of the copolyesters of this invention from being realized. The term "short chain ester units," as applied to units in a polymer chain, refers to the reaction of butanediol (BDO) with aromatic dicarboxylic acids. These units are also referred to herein as "hard segments". The term "long chain ester units," as applied to units in a polymer chain, refers to the reaction products of polytetramethylene ether glycol (PTMEG) with aromatic dicarboxylic acids. These units are also referred to herein as "soft segments."

The weight percent of long chain ester (LCE) units specified herein are calculated in accordance with the following equation in which both the numerator and denominator are expressed in grams.

$$\text{Wt. \% } LCE = \frac{A+B-C}{\text{Theoretical Polymer Yield}}$$

$A$ = (Moles of PTMEG)×(Mole Wt. of PTMEG)
$B$ = (Total Moles of phthalate as Acid)×(Mole Wt. of phthalic Acid Mixture)
$C$ = (Moles $H_2O$)×(Mole Wt. of $H_2O$)

In this equation the moles of phthalate will be the same as the moles of PTMEG and the moles of water will be twice that of PTMEG. The mole weight of the phthalic acid mixture should be a weighted average reflecting the composition of the mixture. The theoretical polymer yield will be the grams of ingredients put into the reaction minus the grams of by-product and excess ingredients distilled off.

The weight percent of short chain ester (SCE) units is defined in an analogous manner:

$$\text{Wt. \% } SCE = \frac{D+E-F}{\text{Theoretical Polymer Yield}}$$

$D$ = (Moles of BDO)×(Mole Wt. of BDO)
$E$ = (Total Moles of phthalate as Acid)×(Mole Wt. of phthalic Acid Mixture)
$F$ = (Moles $H_2O$)×(Mole Wt. of $H_2O$)

Here the moles of butanediol do not include any stoichiometric excess.

The copolyesters of this invention are prepared by polymerizing with each other (a) a mixture of aromatic dicarboxylic acids containing about 55 to 95 percent by weight of terephthalic acid, (b) polytetramethylene ether glycol, and (c) butanediol. By the term "aromatic dicarboxylic acid" is meant a dicarboxylic acid in which each carboxyl group is attached to a carbon atom in an isolated or fused benzene ring or a ring which is itself fused to a benzene ring. The term "dicarboxylic acid," as used herein, is intended to include the equivalents of dicarboxylic acids, that is, their esters or ester-forming derivatives such as acid chlorides and anhydrides, or other derivatives which behave substantially like dicarboxylic acids in a polymerization reaction with glycol.

The aromatic dicarboxylic acid monomers useful herein have a molecular weight of less than about 350. This molecular weight requirement pertains to the acid itself and not to its ester or ester-forming derivative. Thus, the ester of a dicarboxylic acid having a molecular weight greater than 350 is included in this invention provided the acid itself has a molecular weight below about 350.

The aromatic dicarboxylic acids used with terephthalic acid in preparing the segmented copolyesters of this invention can contain any substituent group or combinations thereof which do not interfere with the polymerization reaction. Representative aromatic dicarboxylic acids include isophthalic acid, phthalic acid, bibenzoic acid, substituted dicarboxy compounds with benzene nuclei such as bis(p-carboxyphenyl) methane, p-oxy(p-carboxyphenyl) benzoic acid, ethylene-bis(p-oxybenzoic acid), ethylene-bis(p-benzoic acid), tetramethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, indene dicarboxylic acid, and the like, as well as ring substituted derivatives thereof such as $C_1$–$C_{10}$ alkyl, halo, alkoxy or aryl derivatives. Hydroxy acids such as p-($\beta$-hydroxyethoxy) benzoic acid can also be used provided an aromatic dicarboxylic acid is also present.

The preferred aromatic dicarboxylic acids for use in combination with terephthalic acid in the preparation of the segmented copolyesters are the other aromatic diacids of 8 to 16 carbon atoms, particularly phenylene dicarboxylic acids such as phthalic and isophthalic acids. The most preferred acids are mixtures of terephthalic and isophthalic acids. Preferably, the mixture of aromatic dicarboxylic acids contains about 60 to 75 percent terephthalic acid.

In addition to or in place of a portion of the aromatic dicarboxylic acids described above aliphatic or cycloaliphatic acids can be used. "Aliphatic dicarboxylic acids" are acids in which each carboxy group is attached to a fully saturated carbon atom or to a carbon atom which is part of an olefinic double bond. If said carbon atom is in a ring, the acid is cycloaliphatic, if not, it is aliphatic. Representative aliphatic and cycloaliphatic acids are sebacic acid, 1,3- or 1,4-cyclohexane dicarboxylic acid, adipic acid, glutaric acid, succinic acid, carbonic acid, oxalic acid, itaconic acid, azelaic acid, diethylmalonic acid, fumaric acid, citraconic acid, allylmalonate acid, 4-cyclohexene-1,2-dicarboxylate acid, pimelic acid, suberic acid, 2,5-diethyladipic acid, 2-ethylsuberic acid, 2,2,3,3-tetramethylsuccinic acid, cyclopentanedicarboxylic acid, decahydro-1,5- (or 2,6-) naphthylene dicarboxylic acid, 4,4'-bicyclohexyl dicarboxylic acid, 4,4'-methylenebis(cyclohexyl carboxylic acid), 3,4-furan dicarboxylate, and 1,1-cyclobutane dicarboxylate. The preferred aliphatic acids are the cyclohexanedicarboxylic acids and adipic acid.

Butanediol is used in the preparation of the hard segments of the copolyesters of this invention. The term "butanediol," as used herein, should be construed to include equivalent ester-forming derivatives such as tetrahydrofuran or butanediacetate. Other low molecular weight diols of less than about 250 molecular weight can also be used in addition to or in place of butanediol.

Included among the low molecular weight (less than about 250) diols which react to form short chain ester units of the copolyesters are acyclic, alicyclic and aromatic dihydroxy compounds. Preferred are diols with 2-15 carbon atoms such as ethylene, propylene, isobutylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bisphenols which can be used are bis(p-hydroxy) diphenyl, bis(p-hydroxyphenyl)methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided however, that the molecular weight requirement pertains to the diol only and not to its derivatives.

The polytetramethylene ether glycols used to prepare the soft segments of these copolyesters must have molecular weights of about 1500 to 3500, and preferably about 2000 to 3000. In addition to or in place of the polytetramethylene ether glycols described above other long chain glycols can be used in this invention such as those which have a molecular weight of 1,500 to 3,500, a melting point of less than about alkylene C. including the poly(alkylene oxide) glycols (wherein alklene is $C_2-C_8$) such as poly(1,2- and 1,3-propylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol, poly(nonamethylene oxide) glycol and poly(1,2-butylene oxide) glycol; random or block copolymers of ethylene oxide and 1,2-propylene oxide (used in proportions such that the carbon to oxygen mole ratio in the glycol exceeds 2.5) and poly-formals prepared by reacting formaldehyde with glycols, such as pentamethylene glycol, or mixtures of glycols, such as a mixture of tetramethylene and pentamethylene glycols.

In addition, the dicarboxymethyl acids of poly(alkylene oxides) such as the one derived from polytetramethylene oxide

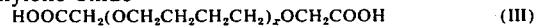

HOOCCH$_2$(OCH$_2$CH$_2$CH$_2$CH$_2$)$_x$OCH$_2$COOH (III)

can be used to form long chain glycols in situ, as discussed below. Polythioether glycols and polyester glycols also provide useful products. In using polyester glycols care must generally be exercised to control a tendency to interchange during melt polymerization, but certain sterically hindered polyesters, e.g., poly(2,2-dimethyl-1,3-propylene adipate); poly(2,2-dimethyl-1,3-propylene/2-methyl-2-ethyl-1,3-propylene 2,5-dimethylterephthalate); poly(2,2-dimethyl-1,3-propylene/2,2-diethyl-1,3-propylene, 1,4-cyclohexanedicarboxylate) and poly(1,2-cyclohexylenedimethylene/2,2-dimethyl-1,3-propylene 1,4-cyclohexanedicarboxylate) can be utilized under normal reaction conditions and other more reactive polyester glycols can be used if a short residence time is employed. Either polybutadiene or polyisoprene glycols, copolymers of these and saturated hydrogenation products of these materials are also satisfactory long chain polymeric glycols. In addition, the glycol esters of dicarboxylic acids formed by oxidation of polyisobutylene diene copolymers are useful raw materials.

Although the long chain dicarboxylic acids (III) above can be added to the polymerization reaction mixture as acids, they react with the low molecular weight diol(s) present, these always being in excess, to form the corresponding poly(alkylene oxide) ester glycols which then polymerize to form the G units in the polymer chain, these particular G units having the structure

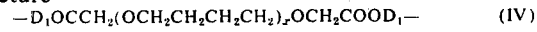

—D$_1$OCCH$_2$(OCH$_2$CH$_2$CH$_2$CH$_2$)$_x$OCH$_2$COOD$_1$— (IV)

when only one low molecular weight diol (corresponding to D$_1$) is employed. When more than one diol is used, there can be a different diol cap (e.g., D$_1$ and D$_2$) at each end of the polymer chain unit. Such dicarboxylic acids may also react with long chain glycols, if they are present, in which case a material is obtained having a formula the same as IV above except the D's are replaced with polymeric residues of the long chain glycols. The extent to which this reaction occurs is quite small, however, since the low molecular weight diol is present in considerable molar excess.

The relative molecular weight of the segmented copolyester is expressed herein in terms of melt index, which is an empirical measurement of inverse melt viscosity. The segmented copolyester should have a melt index of less than about 30 in order to provide compositions having superior pressure sensitive properties. The melt indices specified herein are determined by the American Society for Testing and Materials (herein abbreviated "ASTM") test method D 1238-65T using Condition E at 190°C. with a 2160 gram load.

The segmented copolyester should have a melting point of about 90° to 130°C.

The required melting point of the segmented copolyester is obtained by providing the polyester with crystallizable short chain ester segments. Crystallinity in the short chain ester segments is increased by the use of more linear and symmetrical aromatic diacid. By "linear" aromatic diacid is meant a diacid in which each of the bonds between the carboxyl carbons and their adjacent carbons fall on a straight line drawn from one carboxyl carbon to the other. By "symmetrical" aromatic diacid is meant a diacid which is symmetrical with respect to a center line drawn from one carboxyl carbon to the other. For example, repeating ester units such as tetramethylene terephthalate give an especially high melting short chain ester segment. On the other hand, when a non-linear and unsymmetrical aromatic diacid, such as isophthalic acid, is added to crystallizable short chain ester segments, their melting point is depressed. Small amounts of isophthalic acid are, however, very useful for controlling the melting point and improving the compatibility of segmented copolyesters with low molecular weight thermoplastic resins.

The melting points specified herein are determined by thermomechanical analysis. The melting point is determined by measuring penetration of a penetrometer type probe into a polymer sample at 10 grams load with the temperature programmed at 5°C./min. The details of this method are described in many publications, for example, in *Du Pont Technical Literature for Model 941 Thermomechanical Analyzer*, Du Pont Co., Wilmington, Delaware, Oct. 1, 1968.

The copolyester elastomers of this invention can be made by conventional condensation polymerization procedures, as for example, in bulk or in a solvent medium which dissolves one or more of the monomers. They are conveniently prepared by a conventional ester interchange reaction. A preferred procedure involves heating a mixture of the dimethyl esters of terephthalic and isophthalic acids, with polytetramethylene ether glycol and an excess of butanediol in the presence of a catalyst at 150° to 260°C., followed by distilling off the methanol formed by the interchange. Heating is continued until methanol evolution is complete. Depending on the temperature, catalyst and diol excess, this polymerization is complete within a few minutes to a few hours. This procedure results in the preparation of a low molecular weight prepolymer which can be converted to the high molecular weight segmented copolyester of this invention.

These prepolymers can also be prepared by a number of alternate esterification or ester interchange processes. For example, the polytetramethylene ether glycol can be reacted with the short chain ester copolymer in the presence of catalyst until randomization occurs. The short chain ester copolymer can be prepared by ester interchange from either the dimethyl esters and butanediol, as above, or from the free acids with the diol acetates. Alternatively, the short chain ester copolymer can be prepared by direct esterification from appropriate diacids, anhydrides or acid chlorides with butanediol or by other processes such as reaction of the diacids with cyclic esters or carbonates. Obviously the prepolymer can also be prepared by carrying out these processes in the presence of polytetramethylene ether glycol.

The resulting prepolymer is then converted to the high molecular weight segmented copolyester elastomer by distillation of the excess of butanediol. Best results are usually obtained if this final distillation is carried out at less than 1 mm. pressure and 240°–260°C. for less than 2 hours in the prsence of an antioxidant such as sym-di-beta-naphthyl-p-phenylenediamine or 1,3,5-trimethyl-2,4,6,-tris[3,5-ditertiary-butyl-4-hydroxybenzyl] benzene.

Most practical polymerization techniques rely upon ester interchange to complete the polymerization reaction. In order to avoid excessive hold times at higher temperatures with possible irreversible thermal degradation, it is advantageous to employ a catalyst for the ester interchange reaction. While a wide variety of catalysts can be used, organic titanates such as tetrabutyl titanate, used along or in combination with magnesium or zinc acetates, are preferred. Complex titanates, such as $Mg[HTi(OR)_6]_2$, derived from alkali or alkaline earth metal alkoxides and titanate esters are also very effective. Inorganic titanates such as lanthanum titanate, calcium acetate/antimony trioxide mixtures and lithium and magnesium alkoxides are representative of other catalysts which can be used.

While these condensation polymerizations are generally run in the melt without added solvent, it is sometimes advantageous to run them in the presence of inert solvent in order to facilitate removal of volatile products at lower then usual temperatures. This technique is especially valuable during prepolymer preparation, for example, by direct esterification. Also, butanediol, for example, in terphenyl, is conveniently removed during high polymerization by azeotropic distillation.

The processes described above can be run both by batch and continuous methods. The preferred method for continuous polymerization; namely, ester interchange with a prepolymer, is a well established commercial process.

In addition to the novel segmented copolyesters, the superior pressure sensitive compositions of this invention also contain one or more low molecular weight thermoplastic resins which form compatible mixtures with the segmented copolyester, are thermally stable at about 150°C., and have melt viscosities of less than about 10,000 centipoises at 200°C. The term "thermoplastic resin," as used throughout the specification and claims, is intended to include heat softenable resins, both natural and synthetic, as well as waxy types of material. By the term "compatible" it is meant that there is no separation into distinct layers between the segmented copolyester and the low molecular weight resin or resins at the copolyester melt temperature. In some cases this compatibility is achieved in multicomponent blends even though one of the low molecular weight thermoplastic resin components may not be compatible with the segmented copolyester elastomer alone. By the phrase "thermally stable," it is meant that there is no significant permanent alteration in the properties of the resin after heating at the specified temperature for one hour in the presence of air. The melt viscosities specified herein are measured with a Brookfield viscometer by ASTM test method D 1824-66 at elevated temperatures as indicated.

Suitable low molecular weight thermoplastic resins include hydrocarbon resins, bituminous asphalts, coal tar pitches, rosins, resin based alkyd resins, phenolic resins, chlorinated aliphatic hydrocarbon waxes, chlorinated polynuclear aromatic hydrocarbons, and the like.

The term "hydrocarbon resins" refers to hydrocarbon polymers derived from coke-oven gas, coal-tar fractions, cracked and deeply cracked petroleum stocks, essentially pure hydrocarbon feeds, and turpentines. Typical hydrocarbon resins include coumarone-indene resins, petroleum resins, vinyl aromatic polymers, cyclopentadiene resins, and terpene resins. These resins are fully described in the Kirk-Othmer "Encyclopedia of Chemical Technology," Second Edition, 1966, Interscience Publishers, New York, Volume 11, Pages 242 to 255.

The term "coumarone-indene resins" refers to hydrocarbon resins obtained by polymerization of the resin formers recovered from coke-oven gas and in the distillation of coal tar and derivatives thereof such as phenol-modified coumarone-indene resins. These resins are fully described in the Kirk-Othmer Encyclopedia, supra, Volume 11, Pages 243 to 247.

The term "petroleum resins" refers to hydrocarbon resins obtained by the catalytic polymerization of deeply cracked petroleum stocks. These petroleum stocks generally contain mixtures of resin formers such as styrene, methyl styrene, vinyl toluene, indene, methyl indene, butadiene, isoprene, piperylene and pentylenes. These resins are fully described in the Kirk-Othmer Encyclopedia, supra, Volume 11, Pages 248 to 250. The so-called "polyalkylaromatic resins" fall into this classification.

The term "vinyl aromatic polymers" refers to low molecular weight homopolymers of vinyl aromatic monomers such as styrene, vinyl toluene, and alphamethyl styrene, copolymers of two or more of these monomers with each other, and copolymers containing one or more of these monomers in combination with other monomers such as butadiene, and the like. These polymers are distinguished from petroleum resins in that they are prepared from substantially pure monomer.

The term "cyclopentadiene resins" refers to cyclopentadiene homopolymers and copolymers derived from coal tar fractions or from cracked petroleum streams. These resins are produced by holding a cyclopentadiene-containing stock at elevated temperatures for an extended period of time. The temperatures at which it is held determines whether the dimer, trimer, or higher polymer is obtained. These resins are fully described in the Kirk-Othmer Encyclopedia, supra, Volume 11, Pages 250 and 251.

The term "terpene resins" refers to polymers of terpenes which are hydrocarbons of the general formula $C_{10}H_{16}$ occurring in most essential oils and oleoresins of plants, and phenol-modified terpene resins. Suitable terpenes include alpha-pinene, beta-pinene, dipentene, limonene, myrcene, bornylene, camphene, and the like. These products occur as by-products of coking operations of petroleum refining and of paper manufacture. These resins are fully described in the Kirk-Othmer Encyclopedia, supra, Volume 11, Pages 252 to 254.

The term "bituminous asphalts" is intended to include both native asphalts and asphaltites such as Gilsonite, Glance pitch and Grahanite. A full description of bituminous asphalts can be found in Abraham's "Asphalts and Allied Substances," 6th Edition, Volume 1, Chapter 2, Van Nostrand Co., Inc., particularly Table III on Page 60.

The term "coal tar pitches" refers to the residues obtained by the partial evaporation or distillation of coal tar obtained by removal of gaseous components from bituminous coal. Such pitches include gas-works coal tar pitch, coke-oven coal tar pitch, blast furnace coal tar pitch, producer-gas coal tar pitch, and the like. These pitches are fully described in Abraham's "Asphalts and Allied Substances," supra, particularly Table III on Page 61.

The term "rosins" refers to the resinous materials that occur naturally in the oleoresin of pine trees, as well as derivatives thereof including rosin esters, modified rosins such as fractionated, hydrogenated, dehydrogenated and polymerized rosins, modified rosin esters, and the like. These materials are fully described in the Kirk-Othmer Encyclopedia, supra, Volume 17, Pages 475 to 505.

The term "rosin based alkyd resins" refers to alkyd resins in which all or a portion of the monobasic fatty acid is replaced by rosin (a mixture of diterpene resin acids and non-acidic components). Unmodified alkyd resins are polyester products composed of polyhydric alcohol, polybasic acid and monobasic fatty acid. Rosin based alkyl resins are described in the Kirk-Othmer Encyclopedia, supra, Volume 1, Pages 851, 865 and 866.

The term "phenolic resins" refers to the products resulting from the reaction of phenols with aldehydes. In addition to phenol itself, cresols, xylenols, p-tert.-butylphenol, p-phenylphenol and the like may be used as the phenol component. Formaldehyde is the most common aldehyde, but acetaldehyde, furfuraldehyde and the like may also be used. These resins are fully described in the Kirk-Othmer Encyclopedia, supra, Volume 15, Pages 176 to 207.

The term "chlorinated aliphatic hydrocarbon waves" refers to those waxes which are commonly called "chlorinated waxes" such as chlorinated paraffin waves. These waves typically contain about 30–70 percent by weight of chlorine.

The term "chlorinated polynuclear aromatic hydrocarbons" refers to chlorinated aromatic hydrocarbons containing two or more aromatic rings such as chlorinated biphenyls, terphenyls, and the like, and mixtures thereof. These materials typically contain 30 to 70 percent by weight of chlorine.

The compositions of this invention contain about 1 to 99 percent by weight, preferably 5 to 95 percent by weight, of thermoplastic segmented copolyester elastomer and about 1 to 99 percent by weight, preferably 5 to 95 percent by weight, of low molecular weight thermoplastic resins. More preferably, the composition contains about 20 to 60 percent by weight of the elastomer and about 40 to 80 percent by weight of the resin.

Typically the compositions of this invention contain more than one low molecular weight thermoplastic resin. For example, low molecular weight vinyl aromatic polymers have been found to lower the melt viscosity of these compositions without substantially lowering the softening point. Since low melt viscosity contributes improved wetting by the composition of the surface of the substrate, which results in better adhesion, many useful compositions will contain some vinyl aromatic polymer. Vinyl aromatic polymers are also useful for increasing the compatibility of other resins with the segmented copolyester elastomer. Coumarone-indene resins of high softening point have been found to give strength to the compositions. Phenol-modified coumarone-indene resins have been found to have the effect of lowering the softening point of the compositions. In fact, the effect of phenol-modified coumarone-indene resins on the melting point is so great that the desired melting point is generally achieved by the addition of only a small amount of this resin. Any combination of these desired properties can be achieved mixing mixign two or more low molecular weight thermoplastic resins with the copolyester elastomer in a proper proportion. The low molecular weight thermoplastic resins also have the effect of lowering the cost of the composition.

It is sometimes desirable to stabilize the compositions of this invention against heat or radiation by ultra-violet light. This can be done by incorporating stabilizers or antioxidants in these compositions. Satisfactory stabilizers comprise phenols and their derivatives, amines and their derivatives, compounds containing both hydroxyl and amine groups, hydroxyazines, oximes, polymeric phenolic esters, and salts of multivalent metals in which the metal is in its lower valence state.

Representative phenol derivatives useful as stabilizers include hydroquinone, 2,6-ditertiary-butyl-p-cresol, tetrakis[methylene-3-(3', 5'-ditertiary-butyl-4'-hydroxyphenyl) propionate] methane, 4,4'-bis(2,6-ditertiary-butylphenol), 1,3,5-trimethyl-2,4,6-tris-[3,5-ditertiary-butyl-4-hydroxybenzyl]benzene, and 4,4'-butylidene-bis(6-tertiary-butyl-m-cresol). Various inorganic metal salts or hydroxides can be used as well as organic complexes such as nickel dibutyl dithiocarbamate, maganous salicylate, and copper 3-phenyl-salicylate. Typical amine stabilizers include aromatic amines such as N,N'-bis(beta-naphthyl)-p-phenylenediamine, N,N'-bis-(1-methylheptyl)-p-phenylene diamine, and either phenylbeta-napthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones or benzotriazoles.

The properties of the compositions of this invention can be modified by the incorporation of various conventional inorganic fillers such as wood flour, silicates, silica gel, alumina, clays, chopped fiberglass, titanium dioxide, carbon black, and the like. In general, fillers have the effect of increasing that melt viscosity and the modulus or stiffness of the composition at various elongations.

The properties of the compositions of this invention can be further modified by the incorporation of thermally stable thermoplastic polymers of ethylenically unsaturated monomers including homopolymers of vinyl esters such as vinyl acetate, copolymers of these vinyl esters with other vinyl monomers such as ethylene, vinyl chloride and the like, and polymers of alkyl acrylates and methacrylates, or thermally stable condensation polymers such as polyesters and polyamides, and the like. For example, the addition of a copolymer of ethylene and vinyl acetate often increases the tackiness of pressure sensitive adhesive compositions of this invention. These modifying polymers typically have melt viscosities above about 10,000 centipoises at 200°C. and thus are not low molecular weight thermoplastic resins as defined herein.

These compostions can also be colored by the addition of organic or inorganic pigments or organic dyes where their effect is desired. Suitable inorganic pigments include rutile and anatase titanium dioxides, aluminum powder, cadmium sulfides and sulfo-selenides, lead antimonate, mercury cadmiums, chromates of nickel, tin and lead, ceramic greens such as chromium, cobalt, titanium and nickel oxides, ceramic blacks such as chromium, cobalt and iron oxides, carbon black, ultramarine blue, and the like. Suitable organic pigments include phthalocyanine blues and greens, quinacridones, and the like. Suitable dyes include disperse dyes such as Colour Index Disperse Blues 59, 63 and 64. Optical brightness such as "Uvitex" CF, sold by Ciba Corp., and "Tinopal" AN, sold by Geigy Chemical Corp., may also be incorporated where their effect is desired.

Plasticizers including phthalate esters such as dioctyl phthalate and dicyclohexyl phthalate, aryl phosphates such as tricresyl phosphate, and substituted sulfonamides such as N-cyclohexyl-p-toluene-sulfonamide, and the like, may be added for applications where their effect is desired. Flame retardant additives, such as zinc borate, antimony trioxide, tris(2,3-dichlorpropyl) phosphate, tris(2,3-dibromopropyl) phosphate, chlorinated waves, and the like may be added, if desired. Other minor additives such as surfactants or lubricants may also be added.

One of the important advantages of the thermoplastic compositions of this invention is that the copolyester elastomers and the low molecular weight thermoplastic resins are easy to blend together due to the relatively low melt viscosity of these compositions at elevated temperatures as compared to compositions of the prior art having comparable bond strength. The components of the compositions of this invention can be blended by variously well-known procedures such as, for example, blending in molten form, blending in a solvent, or mixing aqueous dispersions of the components. Blending in the melt may be carried out by first melting the segmented copolyester elastomer and then adding low molecular weight thermoplastic resin to the melt, by first melting the low molecular weight thermoplastic resin and then adding segmented copolyester elastomer to the melt, or by first blending the segmented copolyester elastomer and the low molecular weight thermoplastic resin together in finely divided form and then melting the blend, for example, on a hot roller mill or by simultaneously feeding the components to an extruder.

In addition to these blending procedures, it is also possible to take the copolyester from the synthesis step and, while it is still molten, blend solid, premelted, or liquid low molecular weight thermoplastic resin with it. Other ingredients such as antioxidants, fillers, plasticizers, and the like can also be added at this time. This blending process can be carried out with an in-line mixer or with a separate mixing vessel, and has the advantage that it does not require isolation of the copolyester.

The thermoplastic compositions of this invention can also be blended by dissolving the segmented copolyester and the low molecular weight thermoplastic resin in a solvent. Suitable solvents for preparing these solutions include chlorinated hydrocarbons such as methylene chloride, chloroform, trichloroethylene, solvent mixtures such as mixtures of trichloroethylene and isopropanol, and the like.

Aqueous dispersious of the thermoplastic compositions of this invention can be prepared by dissolving the segmented copolyester and the low molecular weight thermoplastic resin together in a suitable waterimmiscible organic solvent, emulsifying the organic solvent containing the segmented copolyester and the low molecular weight thermoplastic resin in water, and removing the organic solvent as described by Funck and Wolff in U.S. Pat. No. 3,296,172. Dispersions can also be prepared by dissolving the segmented copolyester in a suitable water-immiscible organic solvent, dissolving the low molecular weight thermoplastic resin in a different water-immiscible organic solvent, emulsifying each organic solvent solution in water, removing the organic solvent from each emulsion, thereby forming separate dispersions, and mixing the dispersions together in proper amounts.

Compositions containing about 50 percent by weight or more of segmented copolyester elastomer can be used as concentrates for further compounding with the same or other low molecular weight thermoplastic resins and modifiers, as well as being useful as such. Such concentrated compositions have the advantage of being processable with additional components at lower temperatures and shear requirements than the segmented copolyester elastomer itself. For example, a mixture containing an equal weight of segmented copolyester elastomer and low molecular weight, thermoplastic styrene homopolymer is typically blended at a minimum temperature of about 170°C. However, additional low molecular weight thermoplastic resins can be mixed with this concentrate at a minimum blending temperature of about 140°C. Moreover, additional low molecular weight thermoplastic resins which have limited compatibility with the segmented copolyester elastomer alone tend to be more compatible with such concentrates.

The compositions of this invention are useful as pressure sensitive adhesives. These compositions can be applied in the form of a solution, an aqueous dispersion, or in molten form. The method of application does not appreciably affect the performance of the composition.

Conventional application equipment can be used for applying the compositions of this invention in the various forms. For application of solutions or dispersions various known application techniques can be used including brushing, dipping, roll coating, wirewound rod application, doctoring, printing, and the like. Spraying or curtain coating techniques are also applicable to these forms of the compositions.

The compositions of this invention have sufficient thermal stability to render them suitable for hot melt application with good pot life. Heating to 150° to 200°C. does not appreciably alter the properties of the composition. For application of these compositions in the melt form, dipping, roll coating, calendaring, curtain coating, extruding, hot spraying, and other hot melt application techniques can be used.

The compositions of this invention are characterized by an outstanding combination of pressure sensitive adhesive properties. Performance of a pressure sensitive adhesive is gauged by measurement of both peel and shear adhesion to standard substrates. Tack is also an important property. Compositions described herein display 180° peel values as high as 4–5 lbs./in. and 90° quick stick values as high as 3.5–4.0 lbs./in. They have good shear strength (300+ hrs. at RT) and similarly exhibit good high temperature bond strength (as high as 185 min. at 70°C.). Tack levels are high (1–6 inches) as measured by rolling ball tack or by Polyken probe tack measurement (as high as 950 g.). A good balance of all the properties mentioned above can be obtained by proper formulation, or any one property can be specifically enhanced by formulation.

EXAMPLES OF THE INVENTION

The following examples, illustrating the novel segmented copolyester elastomers and adhesive compositions of this invention, are given without any intention that the invention be limited thereto. All parts and percentages are by weight. Tensile properties were determined with compression molded samples using ASTM test method D1708-66.

The test methods used in the present sensitive adhesive evaluations are procedures developed by the Specifications and Technical Committee of the Pressure Sensitive Tape Council (PSTC) as published in their manual entitled "Test Methods for Pressure Sensitive Tapes - Fifth Edition" and the Polyken Probe Tack Test. Briefly these tests are as follows:

180° Peel Adhesion Test (PSTC-1)

Peel adhesion is the force required to remove a pressure sensitive tape from a substrate at an angle of 180° at a specified speed. The tape is applied to a standard test panel using a 4.5 pound roller to make the contact. The tape is pulled on an Instron machine at the rate of 30 cm./min. and the force is expressed in pounds per inch width of tape.

90° Peel Quick Stick Adhesion Test (PSTC-5)

Quick Stick is that property of a pressure sensitive tape which causes the tape to adhere to a surface instantly using no external pressure to secure more thorough contact. It is measured as the force resisting peeling of a tape at 90° from a standard surface upon which it has been applied under no other pressure than the weight of the tape itself. The tape is peeled from the standard surface in a 90° configuration at the rate of 30 cm./min.

Rolling Ball Tack Test (PSTC-6)

In this test a 7/16 inch diameter steel ball is rolled down an inclined plane to the pressure sensitive surface and the distance the ball rolls is measured. The shorter the distance, the better the tack.

Shear Adhesion Test (PSTC-7)

Shear adhesion is the force required to pull the pressure sensitive tape from a standard flat surface in a direction parallel to the surface to which it has been affixed with a definite pressure. It can be measured in terms of the time required to pull a standard area of tape from the test panel under a standard load. Standard load used was 1000 grams on a 1 in. × 1 in. tape contact area. Testing was conducted at both room temperature and 70°C. Time to failure was recorded.

Polyken Probe Tack Test

A Polyken Probe Tack Tester, Model No. TMI 80-2, was used for this test. This tester is a device for measuring the tackiness of pressure sensitive adhesives, by bringing the flat tip of a probe into contact with the test specimen at a controlled rate, contact pressure, and dwell time, and subsequently breaking the adhesive bond thus formed, also at a controlled rate. The standard probe is a 0.5-cm. diameter, 304 stainless steel rod which is mounted by means of a collet chuck directly on a mechanical force gauge fitted with a dial indicator.

In these tests, the highly polished end of the probe was used. A contact pressure of 100 g./cm.$^2$, and a dwell time of 1 sec. was also used with the probe and sample being brought into contact and separated at the rate of 1 cm./sec. Further details of this test are available from the Kendall Company or Testing Machines Company.

EXAMPLE 1

The following materials are placed in a 3000 ml. resin kettle fitted for distillation:

| | |
|---|---|
| Polytetramethylene Ether Glycol (PTMEG); Number Average Molecular Weight 2100 | 657 g. |
| 1,4-Butanediol (BDO) | 172 g. (40% Excess) |
| Dimethyl Terephthalate (DMT) | 165 g. |
| Dimethyl Isophthalate (DMI) | 165 g. |
| Naugard 445 | 6 g. |
| Tyzor TBT (Tetrabutyltitanate, 5% Solution in BDO) | 24 ml. |

Naugard 445 is an antioxidant sold by Naugatuck Chemicals, a division of Uniroyal. Tyzor TBT, which is tetrabutyltitanate, sold by E. I. du Pont de Nemours and Company, was added as a 5% solution in butanediol.

The reaction kettle is heated to 150°C. at atmospheric pressure at which time the catalyst is charged. The reaction is then heated to 250°C. under a nitrogen atmosphere over a period of 1 hour. Methanol distillation starts almost immediately and is essentially complete in 20 minutes. When the temperature reaches 250°C. a vacuum of 160 mm. is applied and held for 5 minutes, after which the pressure is further reduced to 80 mm. for 5 min., 40 mm. for 5 min., and finally to full vacuum (0.5 mm. of Hg or less) and distillation is continued at full vacuum at 250°C. for 1 hour. The resulting viscous molten product is scraped from the flask in a nitrogen ($H_2O$ and $O_2$ free) atmosphere and allowed to cool. Samples for physical testing are prepared by compression molding at 175°–185°C. followed by rapid cooling in the press. The polymer physical properties are listed in Table I.

EXAMPLE 2

Following the procedure detailed in Example 1, a polymer is prepared from the following materials:

| | | |
|---|---|---|
| Polytetramethylene Ether Glycol; Number Average Molecular Weight 2100 | 726 | g. |
| 1,4-Butanediol | 129 | g. |
| Dimethyl Terephthalate | 180.3 | g. |
| Dimethyl Isophthalate | 90.1 | g. |
| Naugard 445 | 6 | g. |
| Tyzor TBT (Tetrabutyltitanate, 5% Solution in BDO) | 24 | ml. |

The properties of the resulting polymer are described in Table I.

EXAMPLE 3

The following materials are charged to a 20 gallon distillation vessel:

| | | |
|---|---|---|
| Polytetramethylene Ether Glycol; Number Average Molecular Weight 2100 | 6300 | g. |
| 1,4-Butanediol | 1419 | g. (50% Excess) |
| Dimethyl Terephthalate | 2097 | g. |
| Dimethyl Isophthalate | 524 | g. |
| Naugard 445 | 50 | g. |
| Tyzor TBT (Neat) | 5.8 | g. |

The Tyzor TBT is added last to the still and the temperature programmed over 1 hour to 210°C. at atmospheric pressure under nitrogen. When roughly stoichiometric amounts (865 g.) of methanol are distilled off (2-3 hours), the still contents are transferred to an autoclave for further polymerization. The autoclave is held at 240°C. and the pressure is gradually reduced to 1-2 mm. over a 45-minute period. The reaction mixture is held at 240°C. until excess (473 g.) diol is distilled off (4-5 hours). The reaction mixture is then extruded out of the polymerizer in ribbon form and subsequently ground to coarse particles. The physical properties of the resulting polymer are listed in Table I.

EXAMPLE 4

Following the procedure described in Example 3, a thermoplastic copolyester elastomer is prepared from the following materials:

| | | |
|---|---|---|
| Polytetramethylene Ether Glycol; Number Average Molecular Weight 2100 | 6300 | g. |
| 1,4-Butanediol | 1520 | g. (50% Excess) |
| Dimethyl Trephthalate | 1937 | g. |
| Dimethyl Isophthalate | 830 | g. |
| Naugard 445 | 50 | g. |
| Tyzor TBT (Neat) | 5.8 | g. |

During the distillation 913 g. of methanol and 506 g. of butanediol are removed. The physical properties of the resulting polymer are listed in Table I.

EXAMPLE 5

Following the procedure described in Example 3, a thermoplastic copolyester elastomer is prepared from the following materials:

| | | |
|---|---|---|
| Polytetramethylene Ether Glycol; Number Average Molecular Weight 2100 | 5880 | g. |
| 1,4-Butanediol | 1570 | g. (50% Excess) |
| Dimethyl Terephthalate | 1867 | g. |
| Dimethyl Isophthalate | 934 | g. |
| Naugard 445 | 50 | g. |
| Tyzor TBT (Neat) | 5.9 | g. |

During the distillation 924 g. of methanol and 523 g. of butanediol are removed. The physical properties of the resulting polymer are listed in Table I.

EXAMPLE 6

Following the procedure described in Example 3, a thermoplastic copolyester elastomer is prepared from the following materials:

| | | |
|---|---|---|
| Polytetramethylene Ether Glycol; Number Average Molecular Weight 2100 | 10,500 | g. |
| 1,4-Butanediol | 2196 | g. (50% Excess) |
| Dimethyl Terephthalate | 2806 | g. |
| Dimethyl Isophthalate | 1320 | g. |
| Naugard 445 | 75.0 | g. |
| Tyzor TBT (Neat) | 15.0 | g. |

During the distillation 1,362 g. of methanol and 732 g. of butanediol are removed. The physical properties of the resulting polymer are listed in Table I.

EXAMPLE 7

Following the procedure described in Example 1, a thermoplastic copolyester elastomer is prepared from the following materials:

| | | |
|---|---|---|
| Polytetramethylene Ether Glycol; Number Average Molecular Weight 2100 | 630 | g. |
| 1,4-Butanediol | 152 | g. (50% Excess) |
| Dimethyl Terephthalate | 166 | g. |
| Dimethyl Isophthalate | 111 | g. |
| Naugard 445 | 4.6 | g. |
| Tyzor TBT (Neat) | 0.58 | g. |

During the distillation 91.3 g. of methanol and 50.7 g. of butanediol are removed. The physical properties of the resulting polymer are listed in Table I.

EXAMPLE 8

Following the procedure described in Example 1, a thermoplastic copolyester elastomer is prepared from the following materials:

| | | |
|---|---|---|
| Polytetramethylene Ether Glycol; Number Average Molecular Weight 2100 | 567 | g. |
| 1,4-Butanediol | 146 | g. (50% Excess) |
| Dimethyl Terephthalate | 210 | g. |
| Dimethyl Isophthalate | 52 | g. |
| Naugard 445 | 4.2 | g. |
| Tyzor TBT (Neat) | 0.55 | g. |

During the distillation 86.5 g. of methanol and 48.6 g. of butanediol are removed. The physical properties of the resulting polymer are listed in Table I.

EXAMPLE 9

Following the procedure described in Example 1, a thermoplastic copolyester elastomer is prepared from the following materials:

| | | |
|---|---|---|
| Polytetramethylene Ether Glycol; Number Average Molecular WEight 2100 | 588 | g. |
| 1,4-Butanediol | 132 | g. (50% Excess) |
| Dimethyl Terephthalate | 196 | g. |
| Dimethyl Isophthalate | 49 | g. |
| Naugard 445 | 4.2 | g. |
| tyzor TBT (Neat) | 1.0 | g. |

During the distillation 81.0 g. of methanol and 44.0 g. of butanediol are removed. The physical properties of the resulting polymer are listed in Table I.

EXAMPLE 10

Following the procedure described in Example 1, a thermoplastic copolyester elastomer is prepared from the following materials:

| | | |
|---|---|---|
| Polytetramethylene Ether Glycol; Number Average Molecular Weight 2100 | 588 | g. |
| 1,4-Butanediol | 157 | g. (50% Excess) |
| Dimethyl Terephthalate | 187 | g. |
| Dimethyl Isophthalate | 93.5 | g. |
| Naugard 445 | 4.4 | g. |
| Tyzor TBT (Neat) | 0.9 | g. |

During the distillation 92.0 g. of methanol and 52.0 g. of butanediol are removed. The physical properties of the resulting polymer are listed in Table I.

EXAMPLE 11

Following the procedure described in Example 1, a thermoplastic copolyester elastomer is prepared from the following materials.

| | | |
|---|---|---|
| Polytetramethylene Ether Glycol; Number Average Molecular Weight 2100 | 567 | g. |
| 1,4-Butanediol | 146 | g. (50% Excess) |
| Dimethyl Terephthalate | 210 | g. |
| Dimethyl Phthalate | 52 | g. |
| Naugard 445 | 4.2 | g. |
| Tyzor TBT (Neat) | 0.8 | g. |

During the distillation 86.0 g. of methanol and 49 g. of butanediol are removed. The physical properties of the resulting polymer are listed in Table I.

EXAMPLE 12

The following materials are polymerized using a continuous process rather than a batch process as in the previous examples thereby enabling a higher molecular weight polymer to be obtained.

| | | |
|---|---|---|
| Polytetramethylene Ether Glycol; Number Average Molecular Weight 2100 | 400 | parts |
| 1,4-Butanediol | 96.6 | parts |
| Dimethyl Terephthalate | 123 | parts |
| Dimethyl Isophthalate | 52.7 | parts |
| Goodrit 3110 X 104 | 5.82 | parts |
| Tyzor TBT (Neat) | 0.58 | part |

Goodrite 3110 X 104 is a hindered phenol antioxidant sold by B. F. Goodrich Co. The physical properties are listed in Table I.

EXAMPLE 13

Following the procedure described in Example 3, a thermoplastic copolyester elastomer is prepared from the following materials:

| | | |
|---|---|---|
| Polytetramethylene Ether Glycol; Number Average Molecular Weight 2900 | 10,643 | g. |
| 1,4-Butanediol | 1,860 | g. |
| Dimethyl Terephthalate | 2,369 | g. |
| Dimethyl Isophthalate | 1,016 | g. |
| Naugard 445 | 71 | g. |
| Tyzor TBT (Neat) | 14.2 | g. |

During the distillation 1117 g. of methanol and 620 g. of butanediol are removed. The physical properties of the resulting polymer are listed in Table I.

TABLE I
POLYESTER COMPOSITIONS

| | Mole Ratios | | | Tensile Properties | | | Melt Index | Softening Point |
|---|---|---|---|---|---|---|---|---|
| Example | DMT / DMT+DMI | BDO PTMEG[1] | SCE. % | Strength, (psi.) | % Elong. | Init. Modulus, psi. | (2160 g, 190°C.) | (TMA, °C.) |
| 1 | 0.50 | 4.13 | 28.9 | 3700 | 1200 | 680 | 4.10 | 80 |
| 2 | 0.67 | 2.71 | 21.8 | 4220 | 1175 | 540 | 3.70 | 40 |
| 3 | 0.80 | 3.50 | 25.7 | 3920 | 1300 | 2450 | 15.0 | 132 |
| 4 | 0.70 | 3.75 | 27.0 | 4650 | 1400 | 2370 | 9.2 | 117 |
| 5 | 0.67 | 4.15 | 29.1 | 2870 | 1400 | 2460 | 29.7 | 97 |
| 6 | 0.68 | 3.25 | 24.3 | 3800 | 1200 | 1210 | 9.2 | 92 |
| 7 | 0.60 | 3.75 | 27.0 | 2440 | 1250 | 676 | 4.4 | 93 |
| 8 | 0.80 | 4.00 | 28.3 | 5130 | 1230 | 1840 | 3.3 | 132 |
| 9 | 0.80 | 3.50 | 25.7 | 5040 | 1200 | 2430 | 4.4 | 119 |
| 10 | 0.67 | 4.15 | 29.1 | 4100 | 1100 | 2220 | 3.5 | 113 |
| 11 | 0.80 | 4.00 | 28.3 | 4790 | 1300 | 3150 | 5.7 | 132 |
| 12 | 0.70 | 3.75 | 27.0 | 4500 | 1100 | 1430 | 7.3 | 106 |
| 13 | 0.70 | 3.75[2] | 24.8 | 4180 | 1300 | 1120 | 13.6 | 95 |

[1]glycol MW = 2100 except when noted.
[2]Glycol MW = 2900

EXAMPLE 14

A pressure sensitive adhesive blend is prepared by blending the following materials at 175°C. with stirring for approximately 1 hour until homogeneous:

| BLEND 1 | | |
|---|---|---|
| Polymer of Example 1 | 20 | g. |
| Piccolastic A-5 | 20 | g. |
| Piccolastic A-75 | 15 | g. |
| Piccovar L-30 | 15 | g. |
| Aroclor 5460 | 25 | g. |
| Elvax 40 | 5 | g. |
| Naugard 445 | 0.3 | g. |

Piccolastic A-5 is a low molecular weight styrene homopolymer having a ring and ball softening point of about 5°C. and a melt viscosity of 18 centipoises at 190°C. solid by Pennsylvania Industrial Chemical Corp. Piccolastic A-75 is a low molecular weight styrene homopolymer having a ring and ball softening point of about 75°C. sold by Pennsylvania Industrial Chemical Corp. Piccovar L-30 is a polyindene petroleum resin having a softening point of 30°C. sold by Pennsylvania Industrial Chemical Corp. Aroclor 5460 is a chlorinated polyphenyl sold by Monsanto Co. Elvax 40 is an ethylene/vinyl acetate copolymer containing 60 percent ethylene and 40 percent vinyl acetate sold by E. I. du Pont de Nemours and Co.

Adhesive is applied 1 mil thick to 1-mil Mylar film at 120°C. and pressure sensitive adhesive properties are determined. The resulting data are given in Table II.

EXAMPLE 15

Following the procedure of Example 14 a pressure sensitive adhesive blend is prepared by blending the following materials:

| | | |
|---|---|---|
| Polymer of Example 2 | 25 | g. |
| Piccolastic A-25 | 24 | g. |
| Piccolastic A-75 | 16.5 | g. |
| Piccotex LC | 20 | g. |
| Elvax 40 | 4.5 | g. |
| Paraplex G-62 | 10 | g. |
| Naugard 445 | 0.5 | g. |

Piccolastic A-25 is a low molecular weight styrene homopolymer having a ring and ball softening point of about 25°C. sold by Pennsylvania Industrial Chemical Corp. Piccotex LC is a vinyl toluene/α-methyl styrene copolymer sold by Pennsylvania Industrial Chemical Corp. Paraplex G-62 is an epoxidized soybean oil plasticizer sold by Rohm and Haas Co. The resulting data are given in Table I.

EXAMPLE 16

Following the procedure of Example 14 a pressure sensitive adhesive blend was prepared by blending the following materials:

| | | |
|---|---|---|
| Polymer of Example 3 | 30 | g. |
| Piccovar L-30 | 25 | g. |
| Piccotex 75 | 40 | g. |
| Elvax 4260 | 5 | g. |
| Naugard 445 | 0.5 | g. |

Piccotex 75 is a vinyl toluene copolymer petroleum resin sold by Pennsylvania Industrial Corp. Elvax 4260 is an ethylene/vinyl acetate copolymer containing 71 percent ethylene, 28 percent vinyl acetate and 1 percent methacrylic acid sold by E. I. du Pont de Nemours and Company. The resulting data are given in Table II.

EXAMPLE 17

Following the procedure of Example 14 a pressure sensitive adhesive blend is prepared by blending the following materials:

| | | |
|---|---|---|
| Polymer of Example 4 | 30 | g. |
| Piccotex 75 | 33 | g. |
| Picco XPS-250-40 | 4 | g. |
| Piccovar L-30 | 33 | g. |
| Naugard 445 | 0.5 | g. |

Picco XPS-250-40 is a vinyl toluene/α-methyl styrene copolymer sold by Pennsylvania Industrial Chemical Corp. The resulting data are given in Table II. This composition displayed a particularly good balance of pressure sensitive properties. Tack was aggressive and high temperature bond strength was good.

EXAMPLE 18

Following the procedure of Example 14 a pressure sensitive adhesive blend was prepared by blending the following materials:

| | | |
|---|---|---|
| Polymer of Example 5 | 28 | g. |
| Piccolastic A-25 | 25 | g. |
| Piccolastic A-50 | 5 | g. |
| Piccotex LC | 32 | g. |
| Plasticizer Mixture (10.0 parts/ 16.5 parts/9.0 parts diisooctylphthalate/Paraplex G-62/ Santicisor 409) | 10 | g. |
| Naugard 445 | 0.5 | g. |

Piccolastic A-50 is a low molecular weight styrene homopolymer having a softening point of 50°C. and a melt viscosity of 29 centipoises at 190°C. sold by Pennsylvania Industrial Chemical Corp. Santicizer 409 is a dibasic acid/glycol based polyester plasticizer sold by Monsanto Industrial Chemical Co. The resulting data are given in Table II.

EXAMPLE 19

Following the procedure of Example 14 a pressure sensitive adhesive blend is prepared by blending the following materials:

| | | |
|---|---|---|
| Polymer of Example 6 | 30 | g. |
| Piccotex 75 | 40 | g. |
| Piccovar L-30 | 25 | g. |
| Elvax 4260 | 5 | g. |
| Naugard 445 | 0.5 | g. |

The resulting data are given in Table II. This composition gave excellent pressure sensitive properties with very high tack and good high temperature bond strength.

EXAMPLE 20

Following the procedure of Example 14 a pressure sensitive adhesive blend was prepared by blending the following materials:

| | | |
|---|---|---|
| Polymer of Example 7 | 25 | g. |
| Piccolastic A-25 | 26 | g. |
| Piccotex LC | 29 | g. |
| Plasticizer Mixture (See Example 21) | 10 | g. |
| Floral 85 | 10 | g. |
| Naugard 445 | 0.5 | g. |

Foral 85 is a highly stabilized ester resin having a ring and ball softening point of about 85°C. sold by Hercules, Inc. The resulting data are given in Table II.

EXAMPLE 21

Following the procedure of Example 14 a pressure sensitive adhesive blend is prepared by blending the following materials:

| | | |
|---|---|---|
| Polymer of Example 8 | 25 | g. |
| Piccolastic A-25 | 28 | g. |
| Piccotex LC | 27 | g. |
| Plasticizer Mixture (See Example 21) | 10 | g. |
| Floral 85 | 10 | g. |
| Naugard 445 | 0.5 | g. |

The resulting data are given in Table II.

EXAMPLE 22

Following the procedure of Example 14 a pressure sensitive adhesive blend is prepared by blending the following materials:

| | | |
|---|---|---|
| Polymer of Example 9 | 28 | g. |
| Piccolastic A-25 | 25 | g. |
| Piccolastic A-50 | 5 | g. |
| Piccotex LC | 32 | g. |
| Plasticizer Mixture (See Example 21) | 10 | g. |
| Naugard 445 | 0.5 | g. |

The resulting data are given in Table II.

EXAMPLE 23

Following the procedure of Example 14 a pressure sensitive adhesive blend was prepared by blending the following materials:

| | | |
|---|---|---|
| Polymer of Example 10 | 28 | g. |
| Piccolastic A-25 | 25 | g. |
| Piccolastic A-50 | 5 | g. |
| Piccotex LC | 32 | g. |
| Plasticizer Mixture (See Example 21) | 10 | g. |
| Naugard 445 | 0.5 | g. |

The resulting data are given in Table II.

EXAMPLE 24

Following the procedure of Example 14 a pressure sensitive adhesive blend is prepared by blending the following materials:

| | | |
|---|---|---|
| Polymer of Example 11 | 25 | g. |
| Paraplex G-62 | 10 | g. |
| Piccovar L-30 | 25 | g. |
| Piccotex LC | 25 | g. |
| Elvax 4260 | 5 | g. |
| Santicizer 1 H | 10 | g. |
| Naugard 445 | 0.5 | g. |

Santicizer 1 H is N-cyclohexyl-p-toluene sulfonamide sold by Monsanto Industrial Chemical Co. The resulting data are given in Table II.

EXAMPLE 25

Following the procedure of Example 14 a pressure sensitive adhesive blend is prepared by blending the following materials:

| | | |
|---|---|---|
| Polymer of Example 12 | 30 | g. |
| Nevex 110 | 25 | g. |
| Piccovar L-30 | 43 | g. |
| Santicizer 3 | 2 | g. |
| Naugard 445 | 0.5 | g. |

Nevex 110 is a polyindene petroleum resin sold by Neville Chemical Co. Santicizer 3 is N-ethyl-p-toluene sulfonamide sold by Monsanto Industrial Chemical Co. The resulting data are given in Table II. This blend exhibited particular resistance to high temperature shear testing as well as possessing a good overall balance of pressure sensitive properties.

EXAMPLE 26

Following the procedure of Example 14 a pressure sensitive adhesive blend is prepared by blending the following materials:

| | | |
|---|---|---|
| Polymer of Example 12 | 40 | g. |
| Neolyn 20 | 10 | g. |
| Santicizer 1 H | 20 | g. |
| Nevex 110 | 25 | g. |
| Piccotex 75 | 5 | g. |
| Ethyl 330 | 0.5 | g. |

Neolyn 20 is a resin based alkyd resin sold by Hercules, Inc. Ethyl 330 is an antioxidant sold by Ethyl Corp. The resulting data are given in Table II.

EXAMPLE 27

Following the procedure of Example 14 a pressure sensitive adhesive blend is prepared by blending the following materials:

| | | |
|---|---|---|
| Polymer of Example 13 | 30 g. |
| Piccovar L-30 | 45 g. |
| Nevex 100 | 23 g. |
| Santicizer 3 | 2 g. |

The resulting data are given in Table II.

TABLE II

| Blend of Example | Polymer of Example | PSTC-1, lb./in. | PSTC-5, lb./in. | PSTC-6, in. | PSTC-7, hrs. | PSTC-7 (70°C), min. | Polyken Tack, g. |
|---|---|---|---|---|---|---|---|
| 14 | 1 | 3.5 | — | >12 | — | — | — |
| 15 | 2 | 2.0 | 1.3 | 4.5 | — | — | 227 |
| 16 | 3 | 0.5 | 0 | >12 | — | — | 0 |
| 17 | 4 | 4.1 | 3.7 | 7 | 300+ | 13 | 952 |
| 18 | 5 | 1.9 | 2.0 | >12 | — | — | 113 |
| 19 | 6 | 3.7 | 4.0 | 4.5 | 300+ | 20 | 636 |
| 20 | 7 | 2.2 | 1.65 | — | — | — | 420 |
| 21 | 8 | 0.5 | 0.8 | — | — | — | 70 |
| 22 | 9 | 1.8 | 0 | >12 | — | — | 49 |
| 23 | 10 | 0.8 | 1.1 | >12 | — | — | 125 |
| 24 | 11 | 1.3 | 0.7 | >12 | 0 | — | 138 |
| 25 | 12 | 4.2 | 3.5 | 5.8 | 300+ | 22.0 | 662 |
| 26 | 12 | 4.1 | 2.6 | 1.5 | 300+ | 185 | 250 |
| 27 | 13 | 3.6 | 2.5 | 1.0 | — | 2.0 | 540 |

We claim

1. A soft thermoplastic segmented copolyester elastomer consisting essentially of a multiplicity of recurring short chain ester units and long chain ester units joined through ester linkages, said short chain ester units amounting to 15 to less than 30 percent by weight of said copolyester and being of the formula

and said long chain ester units amounting to more than 70 to 85 percent by weight of said copolyester and being of the formula

wherein R is the divalent aromatic radical remaining after removal of the carboxyl groups from aromatic dicarboxylic acid having a molecular weight of less than 350, said aromatic dicarboxylic acid being 55 to 95 percent by weight terephthalic acid, D is the divalent radical remaining after removal of the hydroxyl groups from butanediol, and G is the divalent radical remaining after removal of the terminal hydroxyl groups from polytetramethylene ether glycol having an average molecular weight of 1,500 to 3,500, said copolyester having a melt index of less than 30 and a melting point of 90° to 130°C.

2. The elastomer of claim 1 in which the aromatic dicarboxylic acid is a mixture of terephthalic acid and isophthalic acid.

3. The elastomer of claim 2 in which the polytetramethylene ether glycol has a molecular weight of 2,000 to 3,000.

4. The elastomer of claim 2 in which the mixture of terephthalic acid and isophthalic acid contains 60 to 75 percent by weight of terephthalic acid.

5. A thermoplastic pressure sensitive adhesive composition which comprises, based on the total thermoplastic components, A. 1 to 99 percent by weight of a soft thermoplastic segmented copolyester elastomer consisting essentially of a multiplicity of recurring short chain ester units and long chain ester units joined through ester linkages, said short chain ester units amounting to 15 to less than 30 percent by weight of said copolyester and being of the formula

and said long chain ester units amounting to more than 70 to 85 percent by weight of said copolyester and being of the formula

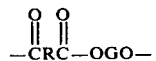

wherein R is the divalent aromatic radical remaining after removal of the carboxyl groups from aromatic dicarboxylic acid having a molecular weight of less than 350, said aromatic dicarboxylic acid being 55 to 95 percent by weight terephthalic acid, D is the divalent radical remaining after removal of the hydroxyl groups from butanediol, and G is the divalent radical remaining after removal of the terminal hydroxyl groups from polytetramethylene ether glycol having an average molecular weight of 1500 to 3500, said copolyester having a melt index of less than 30 and a melting point of 90° to 130°C. and B. 1 to 99 percent by weight of low molecular weight thermoplastic resin which forms compatible mixtures with the segmented copolyester, is thermally stable at 150°C., and has a melt viscosity of less than about 10,000 centipoises at 200°C.

6. The composition of claim 5 in which the low molecular weight thermoplastic resin is selected from the group consisting of hydrocarbon resins, bituminous asphalts, coal tar pitches, rosins, rosin based alkyd resins, phenolic resins, chlorinated aliphatic hydrocarbon waxes, and chlorinated polynuclear aromatic hydrocarbons.

7. The composition of claim 5 in which the thermoplastic segmented copolyester elastomer is present in about 20 to 60 percent by weight and the low molecular weight thermoplastic resin is present in about 40 to 80 percent by weight.

8. The composition of claim 6 in which the aromatic dicarboxylic acid is a mixture of terephthalic acid and isophthalic acid.

9. The composition of claim 8 in which the polytetramethylene ether glycol has a molecular weight of 2000 to 3000.

10. The composition of claim 8 in which the mixture of terephthalic acid and isophthalic acid contains 60 to 75 percent by weight of terephthalic acid.

11. The composition of claim 10 in which the low molecular weight thermoplastic resin is selected from the group consisting of hydrocarbon resins, rosins, and rosin based alkyd resins.

* * * * *

UNITED STATES PATENT OFFICE
CERTIFICATE OF CORRECTION

PATENT NO. : 3,932,326
DATED : January 13, 1976
INVENTOR(S) : George Lok Kwong Hoh and Joseph Edward Reardon It is certified that error appears in the above-identified patent and that said Letters Patent are hereby corrected as shown below:

| Patent Column | Line | Corrections |
|---|---|---|
| 5 | 17 | "alkylene" should be -- 55° -- |
| 9 | 55 | "waves" should be -- waxes -- |
| 9 | 58 | "waves" should be -- waxes -- (2 instances) |
| 10 | 27 | "mixing mixign" should be -- by mixing -- |
| 10 | 66 | "that" should be -- the -- |
| 11 | 17 | "compostions" should be -- compositions -- |
| 11 | 42 | "waves" should be -- waxes -- |
| 12 | 17 | "dispersious" should be -- dispersions -- |
| 13 | 35 | "present" should be -- pressure -- |
| 18 | 55 | "solid" should be -- sold -- |

Signed and Sealed this

Twenty-seventh Day of July 1976

[SEAL]

Attest:

RUTH C. MASON
*Attesting Officer*

C. MARSHALL DANN
*Commissioner of Patents and Trademarks*